United States Patent

[11] 3,630,687

| [72] | Inventors | Roger P. Van Driesen<br>Hopewell;<br>William R. Mounce, Cranbury, both of N.J. |
|---|---|---|
| [21] | Appl. No. | 196 |
| [22] | Filed | Jan. 2, 1970 |
| [45] | Patented | Dec. 28, 1971 |
| [73] | Assignee | Cities Service Research and Development Company<br>New York, N.Y. |

[54] LIQUID DRAWOFF APPARATUS
7 Claims, 3 Drawing Figs.

[52] U.S. Cl.................................................. 23/285,
23/288 E, 23/289, 55/255, 55/256, 208/143,
208/157
[51] Int. Cl....................................................B01d 19/00,
B01j 1/00, B01j 9/16
[50] Field of Search.......................................... 23/288 E,
288, 289, 285, 283, 284; 55/255, 256; 208/108,
143, 157

[56] References Cited
UNITED STATES PATENTS

| 2,768,935 | 10/1956 | Watkins...................... | 23/288 E X |
| 3,319,400 | 5/1967 | Wilson et al.................. | 55/255 |
| 3,425,810 | 2/1969 | Scott, Jr. ...................... | 23/289 |
| 3,523,763 | 8/1970 | Van Driesen et al. ........ | 23/285 X |

Primary Examiner—Joseph Scovronek
Attorney—J. Richard Geaman

ABSTRACT: A liquid drawoff apparatus for use in combination with an operating upflow liquid phase reactor vessel is shown. The liquid drawoff apparatus comprises a transversely mounted plate in the upper portion of the vessel, having a number of risers extending up from holes in the plate, each riser having a horizontal row of orifices midway up the riser and a horizontal row of slots at the riser top, and a collector having a plurality of horizontally extending arms mounted at a level below the row of orifices and above the plate and connected to a liquid drawoff conduit. Each of the arms has a plurality of holes on its underside.

PATENTED DEC 28 1971

3,630,687

INVENTOR.
ROGER P. VAN DRIESEN
WILLIAM R. MOUNCE
BY
ATTORNEY 3,630,687

LIQUID DRAWOFF APPARATUS

BACKGROUND OF THE INVENTION

This invention relates to apparatus for the effective separation of vapor from a liquid. More particularly this invention is directed toward apparatus for efficient separation and removal of vapor and liquid streams from the upper part of a reactor having relatively high liquid velocities.

Various petroleum refining processes utilize reactors in which the reactant as a liquid is passed upwardly in the reactor, the effluent being removed at the top of the reactor. One practice is to withdraw the effluent as a vapor-liquid mixture from the top of the reactor and to use an external vapor-liquid separator of conventional design for separating the components of the mixture by phase. Another conventional practice is to utilize different withdrawal conduits opening into the reactor for separately withdrawing vapor and liquid. The vapor effluent withdrawal conduit is placed to open into the top of the reactor at a point above the liquid level in the reactor so as to provide sufficient disengagement space. The liquid withdrawal conduit is located so as to open below the liquid level. However where there are relatively high liquid velocities present, there exists a tendency for the liquid stream to entrap vapor along with the withdrawn liquid. This is particularly so in those processes having a reactor equipped with an internal recycle to achieve high upward liquid velocities to expand and induce random motion in a particulate catalyst bed. Such an expanded particulate catalyst bed is referred to as an ebullated bed. An example of such a process and reactor is shown in U.S. Pat. No. Re. 25,770 issued Apr. 27, 1965 to Johanson for Gas-Liquid Contacting Process. Of greater relevance is the reactor shown in FIG. 1 of U.S. Pat. No. 3,188,286 issued June 8, 1965 to R. P. Van Driesen, one of the applicants herein. In the latter Patent a reactor having separate liquid and vapor drawoffs is shown in FIG. 1 of the drawing. Such an arrangement poses the necessity of preventing undue vapor entrapment in the liquid withdrawn from the reactor.

SUMMARY OF THE INVENTION

Accordingly we have invented a liquid drawoff apparatus for use with a reactor vessel having separate liquid and vapor drawoffs located in the upper portion of the vessel. The liquid drawoff apparatus comprises a plate transversely mounted in the vessel in the upper portion thereof having a number of vertical risers mounted thereon and communicating between the portion of the vessel below the plate and the upper portion of the vessel, a spaced distance above the plate. A plurality of transversely mounted liquid collecting arms, each having a multiplicity of holes on the underside thereof, are spacedly mounted above the plate and below the risers and are communicatingly connected to a liquid drawoff pipe for withdrawing liquid from the vessel. Preferably each of the risers is a vertical tube having its bottom end fixedly attached to the top of the plate around a hole in the plate and equally spaced from the other risers, each of the risers having a horizontal row of orifices radially spaced in the riser wall at about the middle of the riser and an upper row of slots located at the top of each of the risers. Liquid level in the reactor vessel is established between the upper and lower rows of riser slots and orifices, the flow of liquid being predominately through the lower row of orifices downwardly toward the plate to below the collecting arms and into the collecting arms through the multiplicity of holes on the underside of the collecting arms. Vapor entrapment in the liquid is minimized by the downward flow at minimum velocity of the liquid toward the holes in the underside of the collecting arms.

It is therefore an object of this invention to provide an apparatus for the effective separation of vapor from a liquid in a reactor vessel.

Another object of this invention is to provide an improved vapor-liquid disengagement apparatus for use in an operating reactor vessel having relatively high fluid velocities.

Other objects and advantages of the apparatus of the present invention will be apparent to those skilled in the art from description of the drawings and preferred embodiments which follow.

DESCRIPTION OF THE PREFERRED EMBODIMENTS

Figure 1:
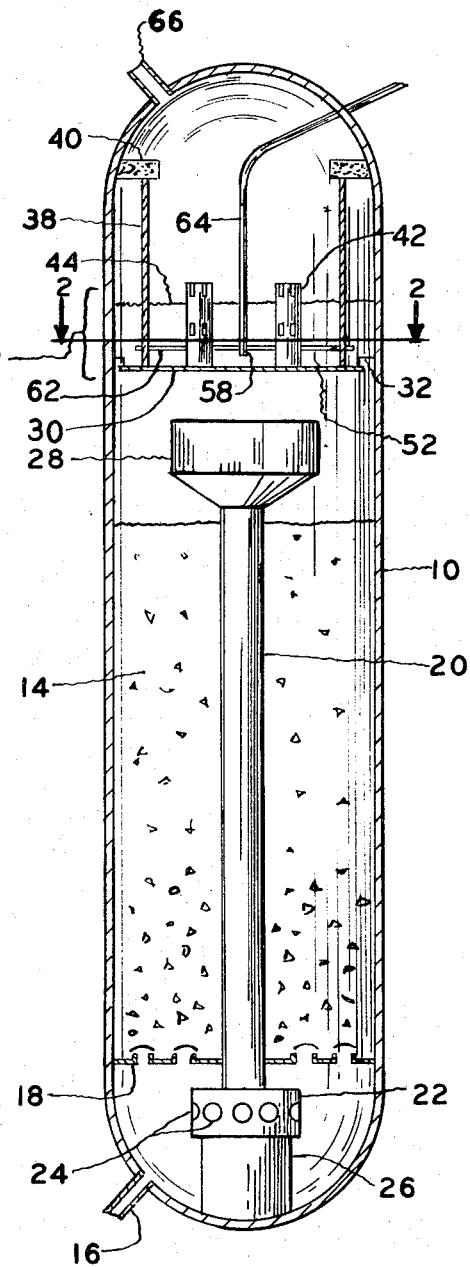
FIG. 1 is a cutaway elevation of a reactor vessel showing the vapor-liquid disengagement apparatus mounted in the vessel.

Referring to FIG. 1 of the drawings showing a reactor vessel 10 in cutaway elevation embodying the vapor-liquid disengagement apparatus 12 of the present invention. The reactor vessel is one preferably used in the high-pressure, high-temperature treatment of heavy hydrocarbon oils with hydrogen in the presence of an ebullated particulate catalyst bed 14. For such a purpose the vessel is constructed to withstand pressures of at least 5,000 p.s.i. and temperatures approaching 1,500° F., although operating pressures are usually no more than 3,000 p.s.i. and temperature no more than 1,000° F.

Suitable feed conduits are mounted in the lower portion of the vessel. For this particular embodiment a feed conduit 16 is shown communicatingly connected to the bottom of the vessel. Feed oil, hydrogen-containing gas and possibly small particulate catalyst is introduced into the bottom of the vessel through the feed conduit 16.

A fluid distributing means such as a bubble cap tray 18 is horizontally mounted in the bottom portion of the vessel above the feed conduit 16. The bubble cap tray 18 insures even distribution of reactor contents over the cross-sectional area of the vessel, and provides a lower boundary for the ebullated catalyst bed. A recycle conduit 20 is vertically mounted in the vessel and extends downward to the lower portion of the reactor through an opening in the bubble cap tray 18. A horizontally mounted centrifugal pump 22 is attached at its inlet port, not shown, to the bottom end of the recycle conduit. A number of outlet ports 24 are located on the radial periphery of the pump 22 through which recycled reactor liquid is exhausted to the bottom of the vessel. The pump 22 is driven by motor 26, preferably a hydraulically powered motor of conventional design. A wide mouth funnel-shaped downcomer head 28 forms the top part of the recycle conduit through which reactor liquid is withdrawn from the upper part of the vessel and recycled back to the vessel bottom.

Mounted above the downcomer head at a spaced distance therefrom to allow adequate fluid flow into the head, is the vapor-liquid disengagement apparatus 12 with its lower boundary formed by a transversely mounted plate 30. The plate has a slightly smaller diameter than the inside of the vessel with a peripheral seal 32 mounted on its upper circumferential surface. The seal 32 is constructed of a number of curved angle irons 34 having an outside radius slightly smaller than the inside radius of the vessel so as to be in sliding contact with the vessel wall when attached to the plate as a seal. The angle irons 34 are tack welded to the plate surface. The plate as the name implies is simply a flat circular plate having a number of equally spaced riser holes 36, specifically six holes arranged radially. The plate is supported within the vessel by six vertically extending hangers 38. The hangers are firmly attached at their lower end to the top of the plate either by welding or by any other suitable mode of attachment as by threaded connection. The upper ends of each of the hangers 38 are attached to support brackets 40 each of which is cantilevered from the inside wall of the vessel at approximately the point where the upper hemispherical end of the vessel meets the vessel sidewall. This point is referred to as the tangent line of the vessel.

Figure 2:
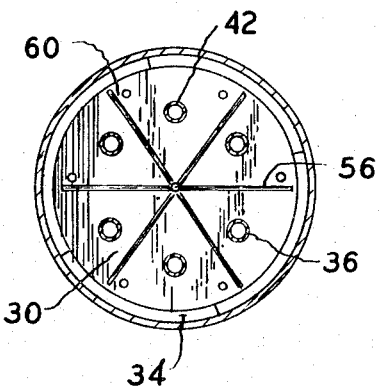
FIG. 2 is a top view of the disengagement apparatus viewed along section 2—2 of FIG. 1.
Figure 3:
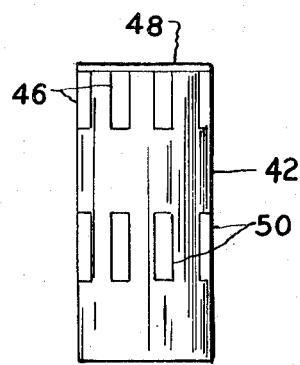
FIG. 3 is an enlarged elevation of one of the risers.

Attached to the plate upper surface around each of the riser holes 36 is a cylindrically shaped riser 42. Each riser 42 as shown in FIGS. 1 and 3 is a cylindrically shaped tube fixedly attached to the rims of each of the riser holes in the plate. Each of the risers extend upward a sufficient distance to more than clear the upper level 44 of the liquid phase reactant level in the vessel and have a number of equally spaced slots 46 cut in the riser wall below the upper edge. A cover 48 is secured on the upper end of each of the risers and forms an upper boundary for the slots 46. The slots act as exit ports for fluid leaving the risers and in the case of the upper row of slots the fluid is principally in the vapor phase with entrained liquid. A horizontal row of rectangular orifices 50 is also cut in the cylindrical wall of the risers midway up the riser length and serves principally for the passage of liquid reactant from the risers into the liquid volume above the plate.

A radially extending collector 52, arranged as the spokes of a wheel, is horizontally positioned in the vessel at a level below the middle row of orifices 50 in the risers and above the plate 30. The collector 52 is formed of six equally spaced hollow arms 56 each radially extending from a central hollow hub 58. Each of the arms 56 is essentially a hollow pipe having a closed distal end 60, a centrally located end opening into the central hub and a substantially large number of holes 62 on the underside of each of the arms. The collector 52 is supported by a liquid drawoff pipe 64 which attached at its bottom end to the central hub and rises vertically in the vessel to a height approximately level with the bottom of the upper hemispherical endcap of the vessel, at which height the drawoff pipe has an oblique bend and then extends to the vessel hemispherical wall and through the wall to further apparatus not shown and not a part of the apparatus of this invention. Finally a vapor effluent withdrawal conduit 66 is connected to the upper part of the vessel. The vapor effluent withdrawal conduit 66 opens into the vessel at a relatively extended distance above the liquid level in order to provide as much height as practical for vapor-liquid disengagement and while the distance shown for such disengagement appears to be significant it should be understood that it is less than would be required to achieve the same results were no vapor-liquid disengagement apparatus employed according to the invention.

For purposes of illustration and not of limitation the following description of the dimensions of a vessel according to the present invention are given. Where applicable the vessel dimensions are illustrative of the internal rather than external sizes and take no account of vessel wall thickness. The cylindrical portion of the vessel between the tangent lines is 19 feet high with the upper and lower hemispherical end caps each extending about 2 feet 3 inches beyond the tangent line giving an internal height of about 23½ feet. The top of the recycle conduit downcomer head is 16 feet above the bottom of the vessel and the downcomer head is 3 feet in diameter at its top. The grid is about 4 feet above the bottom of the vessel. The internal diameter of the vessel is about 4½ feet. The disengagement plate 30 has a diameter of about 4 feet 4 inches which is 2 inches less than the vessel diameter. The peripheral seal is formed from 2-inch angle irons curved to an outside radius of 2 feet 3 inches to obtain a sliding contact between the seal and the internal wall of the vessel. The plate 30 is supported by six 4-foot-long hangers cantilevered from brackets attached to the vessel wall 19 feet above the lower tangent line positioning the plate about 1 foot above the top of the recycle conduit downcomer head.

The plate has the six equally spaced riser holes positioned on a 1½ foot radius, each of the risers being 14 inches high and made from 6-inch nominal diameter pipe (schedule 10S), this being a pipe with an inside diameter of 6.357 inches and a wall thickness of 0.134 inch. The row of 10 equally spaced orifices in each of the riser walls starts at a height of 6 inches above the plate, each orifice being 2 inches high and 1 inch wide.

The upper row of slots on each of the risers are similarily formed rectangular holes 2 inches high and 1 inch wide and start at a height of 1 foot above the plate. In the particular embodiment described there are 10 slots. The level of liquid reactant in the reactor is maintained in the vessel at a height between the position of the riser holes and orifices.

The collector is built from 2-inch nominal diameter schedule-10 pipe (2.157-inch I.D.) each of the arms being approximately 2 feet long and having 10½-inch diameter holes on the underside for entry of liquid effluent. The collector arms are supported by the liquid drawoff pipe at a height of 3 inches above the top of the plate. The drawoff pipe is a nominal 2-inch diameter pipe.

In operation a mixture of hydrocarbon oil feed and hydrogen containing gas is fed to the vessel through the feed conduit 16. Feed and hydrogen containing gas are fed into the bottom of the vessel to establish a space velocity having a range of from 0.2 to 5.0 volumes of feed per hour per volume of reactor. Superficial liquid velocities in the vessel below the disengagement apparatus are about 0.25 f.p.s. while superficial liquid velocities above the disengagement apparatus plate are about 0.05 f.p.s. Flow of liquid effluent is through the risers to the row of orifices and then downwardly toward the collector to the underside of the arms and up into the arms through the multiplicity of holes in their underside. As is readily apparent the liquid flow path makes two 180° turns, the first turn being downwardly. This acts to separate entrapped vapor from the liquid in addition to vapor disengagement achieved by the significantly reduced flow. Vapor tends to exit the risers through the upper row of slots where the vapor flow path is subjected to a right angle turn by the riser cover. Therefore less liquid tends to be carried by the vapor stream as it exits the risers. Liquid collected in the arms of the collector is withdrawn from the vessel through the liquid drawoff pipe. Vapor is separately withdrawn through the vapor effluent conduit.

It should of course be understood that while the disengagement apparatus of our invention is preferably shown in combination with a specific reactor vessel having internal recycling to achieve high internal liquid velocities, the invention can be used in any upward flowing liquid phase reactor where vapor-liquid separation internally in the reactor is required.

Having fully described the apparatus of our invention and wishing to cover those variations and modifications which would be readily apparent to those skilled in the art without departing from either the spirit or scope of the invention,

We claim:

1. In a upflow vessel for treating fluid in the liquid phase and having a vapor effluent withdrawal means at the top of said vessel, said liquid phase upper level being below the effluent withdrawal means, apparatus for separately withdrawing liquid from said vessel comprising a plate horizontally mounted in said vessel at a level below the upper level of said liquid phase, a plurality of risers mounted on said plate, each of said risers having a plurality of orifices positioned below the upper level of said liquid phase and at a spaced distance above said plate and a plurality of radially opening slots positioned above the upper level of said liquid phase, said risers communicating with the portion of said vessel below the plate, collector means mounted in said vessel and having a multiplicity of downwardly opening inlet holes positioned in spaced relation below said riser orifices and above said plate whereby liquid exiting through said orifices moves downwardly towards said collector inlet holes, and liquid drawoff means communicatingly connected to said collector means for withdrawing liquid from said vessel.

2. The apparatus of claim 1 wherein said collector means comprises a number of horizontally mounted hollow arms each of which arms have said multiplicity of downwardly opening holes on the underside thereof.

3. The apparatus of claim 2 wherein each of said risers has an end cover adjacent said plurality of radially opening slots.

4. An upflow vessel for treating a heavy hydrocarbon oil feed in the presence of particulate catalyst, said vessel having a vapor effluent withdrawal means at the top thereof, a feed means at the bottom, and a vertically mounted recycle conduit for recycling liquid back to the bottom of the vessel, said liquid having an upper level above the recycle conduit and below the vapor effluent withdrawal means, the improvement which comprises apparatus for separately withdrawing treated liquid from the vessel, said apparatus comprising

- a plate horizontally mounted in said vessel above said recycle conduit and below the upper level of liquid in the vessel,
- a plurality of risers mounted on said plate, each of said risers having a plurality of radially opening orifices positioned below the upper level of the liquid and at a spaced distance above said plate and a plurality of radially opening slots positioned above the level of the liquid, each of said risers communicating through said plate with the interior of said vessel below the plate,
- collector means horizontally mounted in said vessel and having a multiplicity of downwardly opening inlet holes in spaced relation below said riser orifices and above said plate, and
- liquid drawoff means communicatingly connected to said collector means for withdrawing liquid from said vessel.

5. The apparatus of claim 4 wherein said collector means comprises a number of horizontally mounted hollow arms each of which arms have said multiplicity of downwardly opening holes on the undersides thereof.

6. The apparatus of claim 5, wherein each of said risers has an end cover adjacent said plurality of radially opening slots.

7. In an upflow vessel for treating fluid in the liquid phase and having a vapor effluent withdrawal means at the top of said vessel, said liquid phase upper level being below the effluent withdrawal means, apparatus for separately withdrawing liquid from said vessel comprising

- a plate horizontally mounted in said vessel at a level below the upper level of said liquid phase,
- a plurality of risers mounted on said plate, each of said risers having at least one orifice positioned below the upper level of said liquid phase and at a spaced distance above said plate and at least one outlet positioned above the upper level of said liquid phase, said risers communicating with the portion of said vessel below the plate,
- collector means mounted in said vessel and having a multiplicity of downwardly opening inlet holes positioned in spaced relation below said riser orifice and above said plate whereby liquid exiting through said orifice moves downwardly towards said collector inlet holes, and
- liquid drawoff means communicatingly connected to said collector means for withdrawing liquid from said vessel.

* * * * *